United States Patent
Chapel et al.

(10) Patent No.: US 8,004,115 B2
(45) Date of Patent: Aug. 23, 2011

(54) AUTOMATIC TRANSFER SWITCH MODULE

(75) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 0 days.

(21) Appl. No.: 12/569,733

(22) Filed: Sep. 29, 2009

(65) Prior Publication Data

US 2010/0141038 A1    Jun. 10, 2010

Related U.S. Application Data

(63) Continuation of application No. 12/531,212, filed as application No. PCT/US2008/057140 on Mar. 14, 2008, now abandoned.

(60) Provisional application No. 60/894,842, filed on Mar. 14, 2007.

(51) Int. Cl.
*H02J 9/00* (2006.01)

(52) U.S. Cl. ............................ 307/64; 307/38

(58) Field of Classification Search .................... 307/38, 307/64
See application file for complete search history.

(56) References Cited

U.S. PATENT DOCUMENTS

| | | |
|---|---|---|
| 4,044,268 A | 8/1977 | Hammel |
| 4,812,672 A | 3/1989 | Cowan et al. |
| 5,268,850 A | 12/1993 | Skoglund |
| 5,281,859 A | 1/1994 | Crane |
| 5,289,148 A | 2/1994 | Siglock et al. |
| 5,455,735 A | 10/1995 | Zerega |
| 5,498,915 A | 3/1996 | Crane |
| 5,579,201 A | 11/1996 | Karagoezian |
| 5,747,890 A | 5/1998 | Yin |
| 5,821,636 A | 10/1998 | Baker et al. |
| 5,917,253 A | 6/1999 | Rusnack |
| 5,939,799 A | 8/1999 | Weinstein |
| 5,959,448 A | 9/1999 | Baranski et al. |
| 6,169,340 B1 | 1/2001 | Jones |
| 6,330,176 B1 | 12/2001 | Thrap et al. |
| 6,552,888 B2 | 4/2003 | Weinberger |
| 6,593,723 B1 | 7/2003 | Johnson |
| 6,608,403 B2 | 8/2003 | Liu et al. |
| 6,768,225 B2 | 7/2004 | Chang et al. |
| 6,876,103 B2 * | 4/2005 | Radusewicz et al. ........... 307/64 |
| 6,882,530 B2 | 4/2005 | Cyphers et al. |
| 7,129,599 B2 | 10/2006 | Divan et al. |
| 7,208,850 B2 * | 4/2007 | Turner ............................ 307/64 |
| 2003/0117761 A1 | 6/2003 | Pebles et al. |
| 2004/0169420 A1 * | 9/2004 | Rendic ............................ 307/38 |

* cited by examiner

*Primary Examiner* — Robert L. DeBeradinis
(74) *Attorney, Agent, or Firm* — Marsh Fischmann & Breyfogle LLP; Kent A. Fischmann (57) ABSTRACT

An automatic transfer switch for automatically switching an electrical load between two power sources that includes a switch module containing circuitry for facilitating the switching function, and having two attached input cables and one attached output receptacle. The switch module may be mounted directly on or adjacent to the back of a piece of rack-mounted equipment, thereby minimizing the probability of a power failure between the switch and the equipment. The switch is relatively small, requires no mounting space within a rack, and requires minimal cord lengths.

57 Claims, 8 Drawing Sheets

AUTOMATIC TRANSFER SWITCH MODULE

CROSS-REFERENCE TO RELATED APPLICATION

This application is a continuation-in-part of U.S. patent Ser. No. 12/531,212, entitled: "AUTOMATIC TRANSFER SWITCH," filed on Sep. 14, 2009, which is the U.S. National Stage of PCT Application US2008/57140, entitled: "AUTOMATIC TRANSFER SWITCH MODULE," filed on Mar. 14, 2008, which claims priority from U.S. Provisional Application No. 60/894,842, entitled: "AUTOMATIC TRANSFER SWITCH MODULE," filed on Mar. 14, 2007, the contents of which are incorporated herein as if set forth in full.

BACKGROUND

Electronic data processing (EDP) equipment, such as servers, storage devices, or the like, are generally coupled to alternating current (AC) power sources in a data center and require very high reliability. For this reason, this equipment is generally coupled to one or more uninterruptible power sources (UPS). When redundant power sources (e.g., A and B power sources) are supplied in a data center, the data center manager must manage the provisioning and capacity demand for both of the sources. The provisioning must be done so that if either of the two sources fails, the remaining power source has sufficient power capacity to carry the total load of the equipment. However, the complexity of delivering power from a UPS to the equipment often creates numerous possibilities for interruption. For example, interim circuit breakers, power connection plugs and receptacles, power distribution units (PDUs), power strips, and other distribution systems are often placed in the circuit path between large UPS systems and the equipment. These components increase the probability of an interruption or disconnection of the equipment from the power sources.

Alternatively, some EDP equipment include only one power supply and one AC power input. In this configuration, the equipment is subject to the failure of the single AC source. EDP equipment may contain a dual power supply arrangement that can provide direct current (DC) power to the internal circuits of the equipment from two separate AC sources. In this arrangement, the failure of one of the AC sources will result in the equipment load being supplied from the alternate DC power supply in the unit. At times when both AC sources are present, the load is either shared by both power supplies, or favored to one of the power supplies. These systems, sometimes referred to as "redundant supplied" systems, may be a final line of defense for reliable power delivery to the electronic circuits within the equipment. However, these solutions may be costly due to the additional power supplies that may be required. In addition, the added components generate more heat, which may be extremely undesirable in many applications. Further, the additional components may require rack space, which may be extremely costly. Finally, the additional components may increase the number of cords (e.g., network cords, power cords, and the like), which may significantly reduce the cooling airflow in the racks, thereby reducing the overall maximum achievable deployment density and increasing energy costs.

It is against this background that the automatic transfer switch module described herein has been developed.

SUMMARY

The following embodiments and aspects of thereof are described and illustrated in conjunction with systems, tools, and methods which are meant to be exemplary and illustrative, and not limiting in scope.

In accordance with one aspect of the current invention, an automatic transfer switch for automatically switching an electrical load between two power sources is provided. The automatic transfer switch includes a switch module, and primary and secondary input cords, each attached to the switch module, and each for receiving power from a different one of the two power sources. For use in data center environments with A-B power sources, it is desirable to deterministically manage the load on the A and B power sources. The automatic transfer switch may be operable to prefer and use the A power source (i.e., primary power source) when it is available and only use the B power source (i.e., secondary power source) when the A power source is unavailable. The automatic transfer switch also includes an output cord attached to the switch module, for supplying power to the electrical load. Additionally, the automatic transfer switch includes a relay (e.g., a mechanical relay, a solid-state relay, or the like) disposed within the switch module and coupled to the primary input cord. The relay is operable to sense a suitable power delivery (i.e., quality) on the primary input cord and automatically couple the output cord to either the primary or secondary input cords in accordance with a value of the input power quality.

The automatic transfer switch may be implemented in a relatively small device that is suitable for deployment in the back of, or plugged into, a rack mounted electrical device. The rack mounted electrical devices may be used in any structure suitable for supporting electrical devices (e.g., 2 post equipment racks, 4 post equipment racks, various types of cabinets, or the like). The switch module preferably occupies less than 10 cubic inches, and more preferably, less than 3 cubic inches. In this regard, the switch does not occupy any valuable mounting space in an equipment rack, and may reduce cooling problems that are associated with sizable components and longer power cords used in traditional designs. The switch may also consume relatively little power (preferably less than about 2 Watts at full load and less than about 500 milliwatts, e.g., 100-200 milliwatts, at minimum load) compared to other automatic transfer switches, due to the reduced number and size of its components and its design.

In accordance with another aspect of the present invention, an automatic transfer switch for automatically switching an electrical load between two power sources is provided. The automatic transfer switch includes a switch module that occupies less than 10 cubic inches of space. The automatic transfer switch also includes primary and secondary input cords, each attached to the switch module, and each for receiving power from a different one of the two power sources, and an output cord or direct connection receptacle that is attached to the switch module for supplying power to the electrical load. Additionally, the automatic transfer switch includes one or more relays contained within the switch module and having a voltage sensitive input coupled to the primary input cord for coupling the output cord to the primary input cord when a power quality of the primary input cord is acceptable, and for coupling the output cord to the secondary input cord when a power quality on the primary input cord is not acceptable.

According to a still further aspect of the present invention, a method for use in providing power to an electrical device is provided. The method includes providing an auto-switching device having a first interface for coupling to a first power source, a second interface for coupling to a second power source, and a third interface for coupling to the electrical device to be powered. The auto-switching device is operative to automatically switch between the first and second power sources in response to an interruption of the quality of the primary input power. The method also includes coupling the first interface to the first power source, coupling the second interface to the second power source, and coupling the third interface to the electrical device.

According to a still further aspect of the present invention, a system for powering a rack mounted electrical device is provided. The system includes a rack or cabinet that has a plurality of vertically spaced electrical devices attached to the rack or resting on vertically spaced shelves supplied for supporting electrical devices thereon. The rack further includes first and second power strips associated with respective first and second power sources. Further, the system includes an auto-switching module including a first cord coupled to the first power strip, a second cord coupled to the second power strip, and a third cord coupled to an electrical device attached to the rack or supported on one of the shelves of the rack. The auto-switching module is operative to switch a supply of power to the electrical device between the first and second power strips in response to an interruption of power.

According to a still further aspect of the present invention, an automatic transfer switch for automatically switching an electrical load between two power sources is provided. The automatic transfer switch includes a switch module, and primary and secondary input cords, each attached to the switch module, and each for receiving power from a different one of the two power sources. The automatic transfer switch also includes an output receptacle, attached to the switch module, for supplying power to the load. Additionally the automatic transfer switch includes one or more relays disposed within the switch module and coupled to the primary input cord. The one or more relays are operable to sense the availability and quality of power on the primary input cord and automatically couple the output receptacle to one of the primary and secondary input cords in accordance with the suitability of the power availability on the primary input cord.

In accordance with a still further aspect of the present invention, an automatic transfer switch module includes further functionality for providing load limit warnings and protecting against over-current conditions. In connection with certain circuit implementations of the automatic transfer switch module, it may be desired or required to provide protection related to high current conditions. Two examples of such conditions relate to progressive loading of the module until an operating limit is approached or exceeded and short circuits or other anomalies. Such situations could be addressed by fuses or the like. However, while fuses may be effective to avoid damage, they can be inconvenient in operation.

The present invention addresses these concerns by implementing a virtual circuit breaker (VCB). The VCB operates in response to sensing a current in the module and executing logic to control switches based on the sensed current. Thus, in a preferred implementation, one or more thresholds are established for providing warnings based on current levels and, optionally, associated durations. For example, if a first current threshold is exceeded for a first length of time, a first visual and/or audible warning may be activated (e.g., a yellow light) and if a second current threshold is exceeded for a second length of time, a second warning may be activated (e.g., red light). A further threshold may result in tripping of the VCB to protect the module or prevent blowing of a fuse. In this manner, data center or other technicians are warned before triggering inconvenient power interruptions, the need to change difficult to access fuses is reduced, and the module is fully protected.

In addition to the exemplary aspects and embodiments described above, further aspects and embodiments will become apparent by reference to the drawings and by study of the following descriptions.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 1:
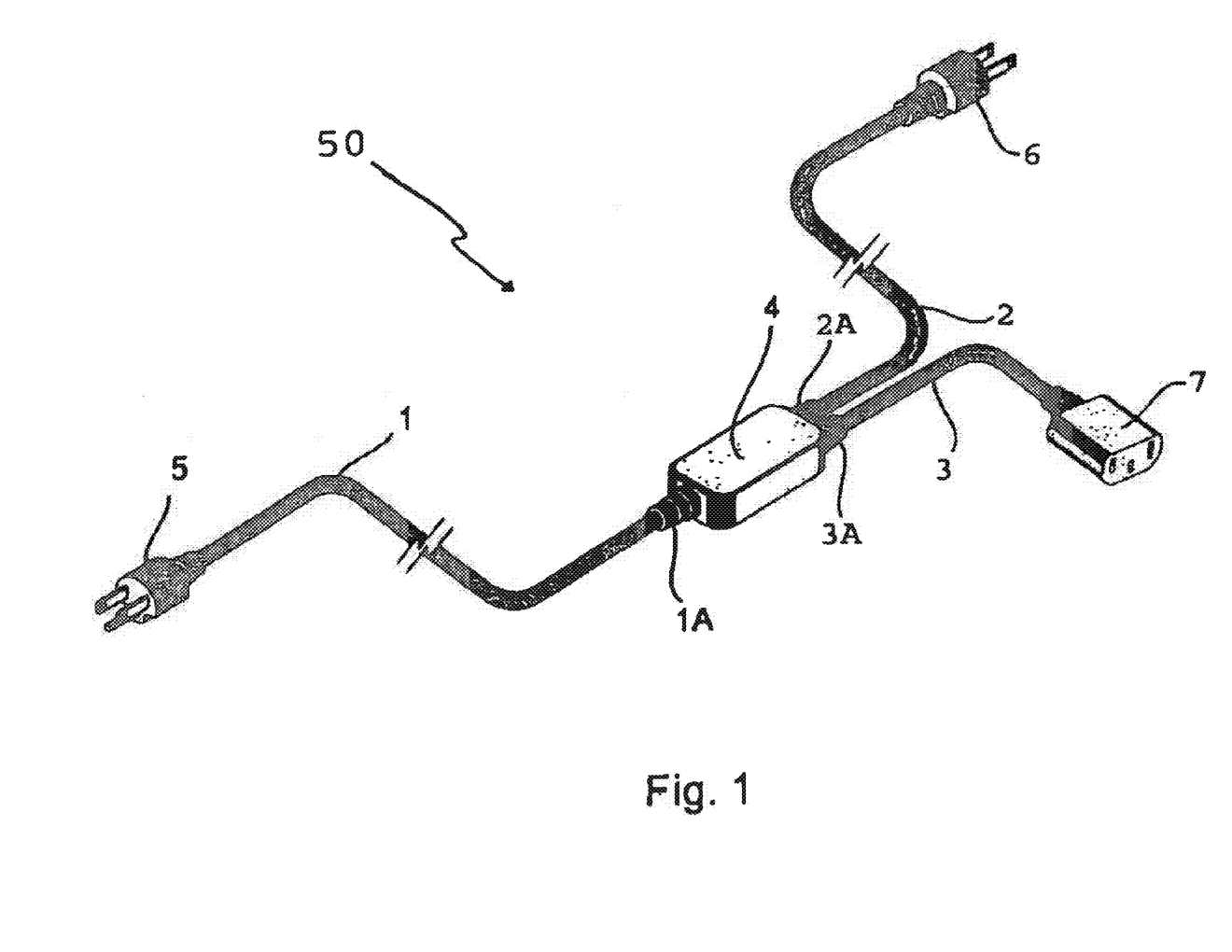
FIG. 1 is a perspective drawing of an exemplary automatic transfer switch.

A perspective view of an automatic transfer switch 50 is presented in FIG. 1. The automatic transfer switch 50 may include a module 4 located at the intersection of three power cords 1, 2, 3. The three power cords 1, 2, 3 may be coupled to the module 4 and may include a primary input cord 1 and a secondary input cord 2, terminated with plugs 5, 6, respectively, and a single output cord 3 terminated with a receptacle 7. The plugs 5, 6 and the receptacle 7 may be of a type that generally fits standard EDP equipment (e.g., NEMA 5-15, NEMA 5-20, IEC 320-C13, IEC 320-C14, etc.). The cords 1, 2, 3 may be coupled to the module 4 by strain-relieving devices 1A-3A. In one embodiment, the input cords 1, 2 are no greater than 24 inches in length, and the output cord 3 is no greater than 12 inches in length, thereby reducing clutter and improving cooling airflow as may be desired, e.g., in a data center deployment.

Figure 2:
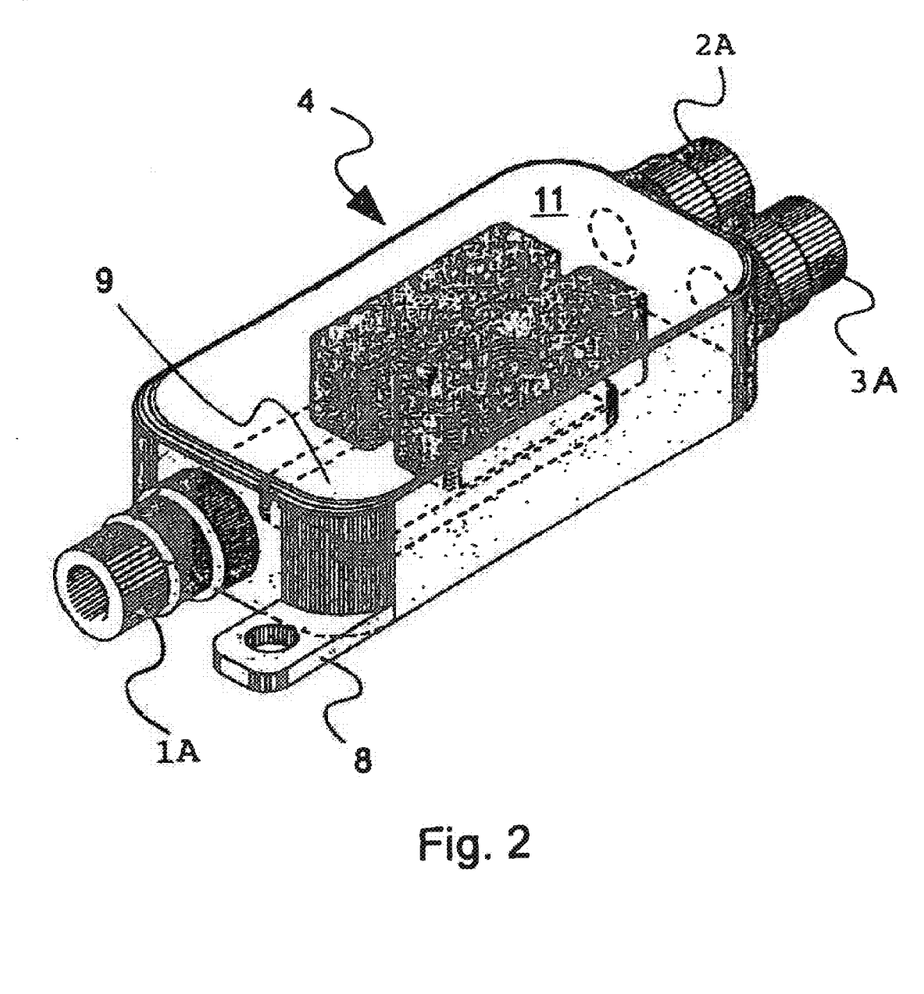
FIG. 2 is a perspective drawing of the enclosure of the automatic transfer switch.

FIG. 2 is a perspective view of the structure of the module 4. It will be appreciated that the shape or form factor of the module may be varied in accordance with the present invention. The module 4 may include an enclosure 11, one or more relays 12, and the cord strain-relieving devices 1A-3A. The module 4 may also include a mounting tab 8 and an attaching permanent magnet 9. The enclosure 11 may be an injection-molded block of thermoplastic formed around the components of the module 4. As an alternative, the enclosure 11 may further include a metal enclosure surrounding the molded block. Further, the enclosure 11 may be a metal or plastic enclosure with the interior components supported within by a compliant insulating material or by appropriate mechanical supports. The attaching permanent magnet 9 may be embedded in the molded block or, alternatively, attached to a metal or plastic enclosure. The dimensions of the enclosure are preferably no more than about 1.75 inches in width and height, and no more than about 4.5 inches in length. In one embodiment, the dimensions of the enclosure 11 are approximately 1.5 inches in width by 0.75 inches in height by 4.25 inches in length.

Figure 3:
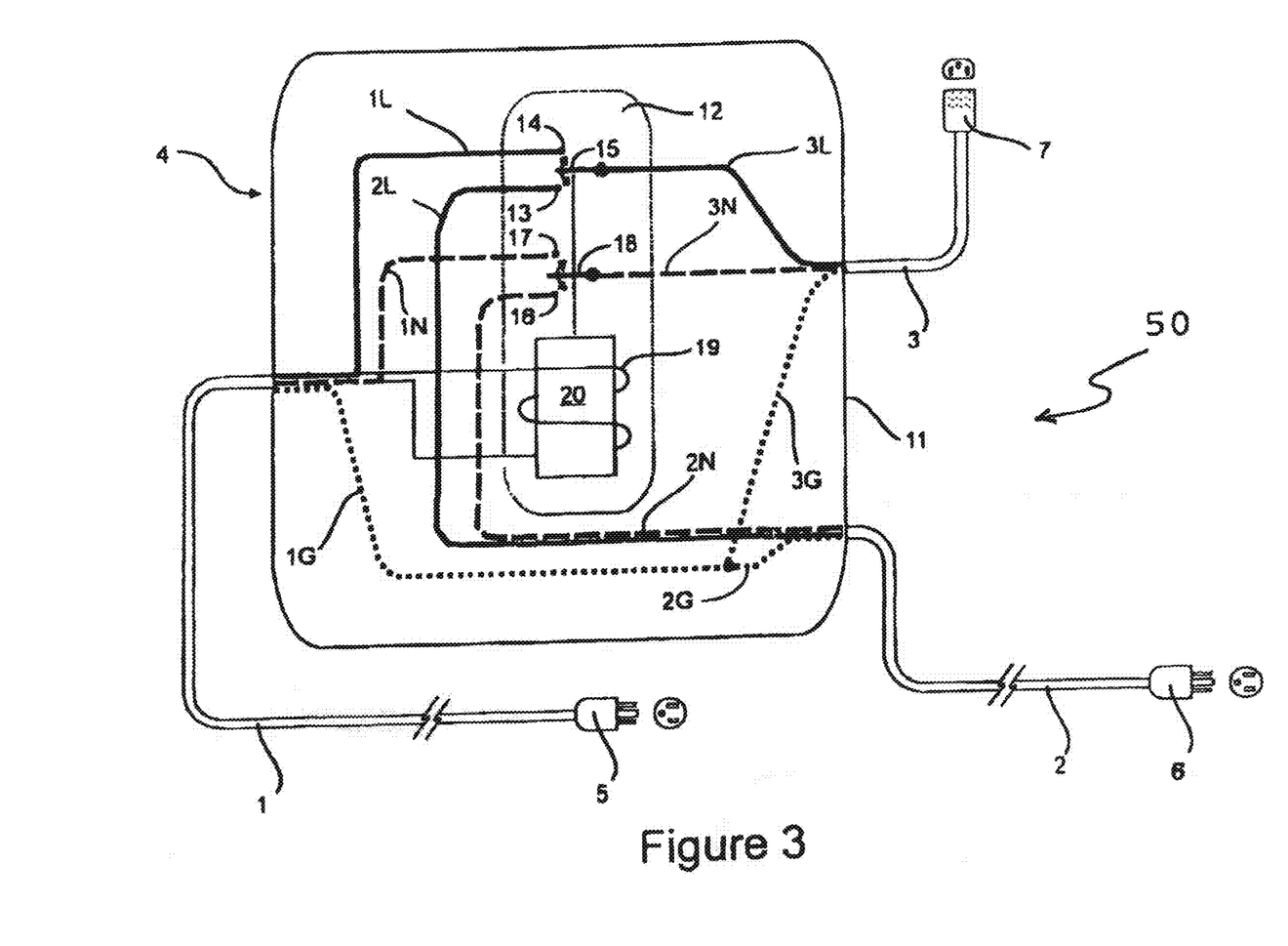
FIG. 3 is a schematic diagram of the automatic transfer switch.

FIG. 3 illustrates one embodiment of a schematic diagram for the automatic transfer switch 50. The module 4 includes the enclosure 11, the relay 12, and connections for the power cords 1, 2, 3. The relay 12 includes a normally open (NO) line contact 14, a normally closed (NC) line contact 13, a line transfer contact 15, a NO neutral contact 17, a NC neutral contact 16, a neutral transfer contact 18, a coil 19, and a core 20. The relay 12 may be a double-pole double-throw (DPDT) relay and is shown as such in the schematic. However, the relay may include two matched single-pole double-throw (SPDT) relays, or other configurations that achieve the desired function.

The power cords 1, 2, 3 may include line conductors 1L, 2L, 3L, neutral conductors 1N, 2N, 3N, and ground conductors 1G, 2G, 3G, respectively. As an example, the plugs 5, 6 may be three-conductor, 15 ampere type, such as National Electrical Manufacturers Association (NEMA) Type 5-15, and the receptacle 7 may be a three-conductor, 15 ampere type, such as a type 320-C13 IEC connector, both of which are commonly used in EDP equipment.

The specific connections of the relay 12 are now described. As can be seen, the three ground conductors 1G, 2G, 3G may be electrically coupled together. The primary line conductor 1L may be connected to the NO contact 14, and the secondary line conductor 2L may be connected to the NC contact 13. The output line conductor 3L may be connected to the transfer contact 15 of the relay 12. Additionally, the primary neutral conductor 1N may be connected to the NO contact 17, and the secondary neutral conductor 2N may be connected to the NC contact 16. The output neutral conductor 3N may be connected to the transfer contact 18 of the relay 12.

The coil 19 of the relay 12 may be connected between the primary line conductor 1L and the neutral conductor 1N. In operation, when the voltage on the primary input cord 1 is above a minimum acceptable value for operation of the equipment, the relay 12 may be energized by the voltage applied to the coil 19. In this state, the NO contacts 14, 17 are coupled to the transfer contacts 15, 18 of the relay 12. This causes the conductors 1L and 3L to be coupled together, as well as the conductors 1N and 3N, such that the output cord 3 is coupled to the primary input cord 1. If the voltage on the primary input cord 1 falls below a minimum acceptable value, the relay 12 may be de-energized, which causes the NO contacts 13, 16 to be disconnected and the NC contacts 14, 17 to be coupled to the transfer contacts 15, 18, and the output cord 3 to be coupled to the secondary input cord 2. In this manner, the equipment is automatically coupled to the secondary power source when the voltage on the primary power source is unacceptable. If the voltage on the primary input cord 1 again exceeds the minimum acceptable values, the relay 12 may again be energized and the output, cord 3 may be disconnected from the secondary input cord 2 and reconnected to the primary input cord 1. That is, the relay 12 is energized when the voltage in the input power cord 1 exceeds a first value, which is greater than the minimum acceptable value, and is de-energized when a voltage drops below a second value, which is less than the first value but still greater than, or equal to, the minimum acceptable value. This hysteresis may be desirable in that it prevents the chattering of the relay 12 that may occur if the same voltage value were used for energizing and de-energizing the relay 12.

Although not shown, varistor or zener diode devices may be coupled across the input or output conductors to limit voltage spikes due to external or switching transients. Also, various types of line filters may be included if necessary or desired. In addition, it will be appreciated that many other hardware implementations of the module 4 are possible including, for example, implementation via solid state coupling rather than mechanical relay coupling.

The automatic transfer switch 50 may include devices for mounting the module 4 as shown in FIG. 2. One mounting device may be the permanent magnet 9 for attaching the module 4 to a ferromagnetic mounting surface, such as a steel mounting surface. The magnet 9 may be embedded in the module 4, or alternatively, it may be attached to the surface of the module 4. Additionally or alternatively, the module 4 may include the mounting tab 8. The mounting tab 8 may include a screw hole, such that the tab 8 may be screwed or tie-wrapped to a desired mounting location.

Figure 5:
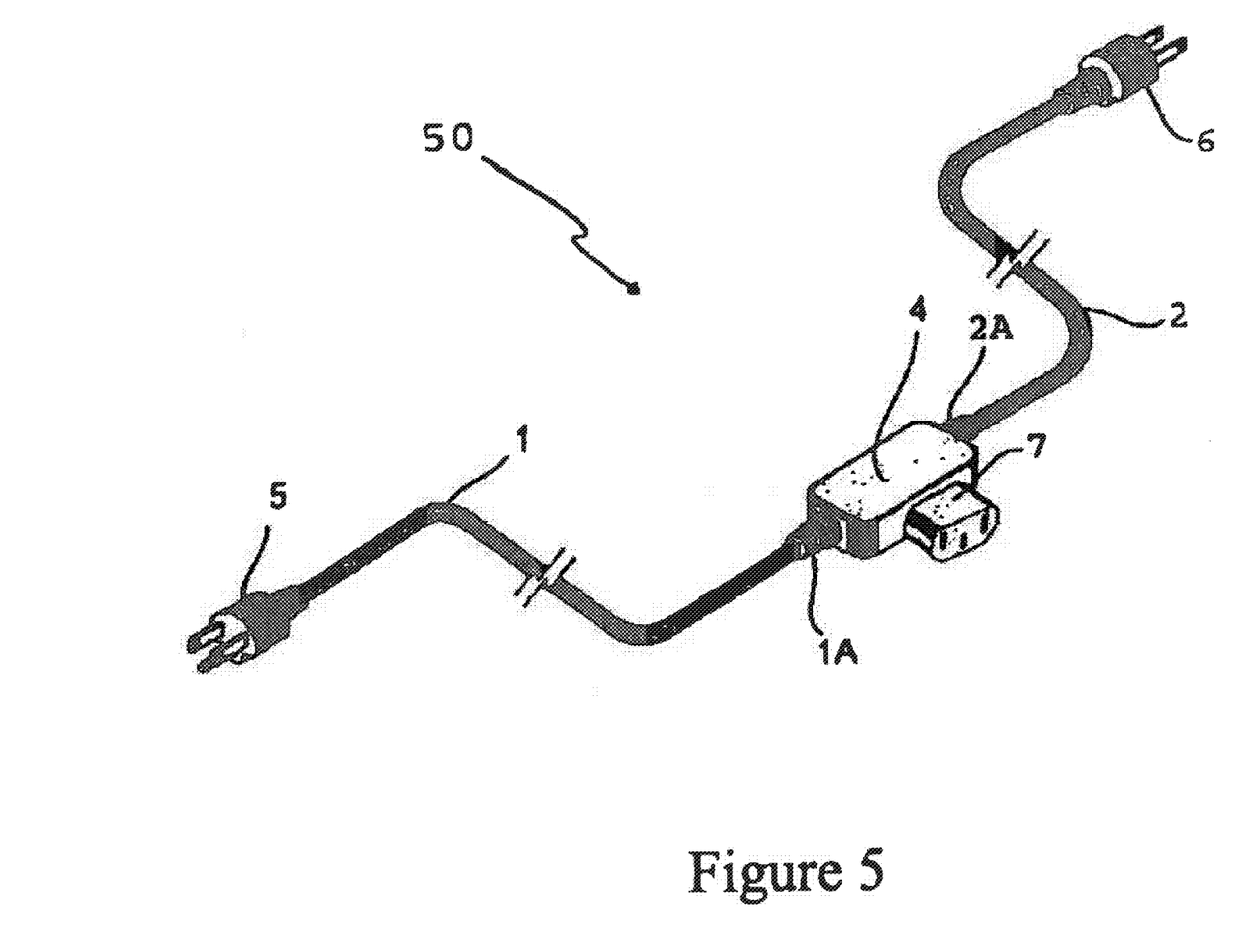
FIG. 5 is a perspective drawing of another embodiment of an exemplary automatic transfer switch.

FIG. 5 illustrates another embodiment of the automatic transfer switch 50 in which the receptacle 7 may be directly connected to the module 4. In this configuration, the module 4 may be plugged directly into a piece of equipment, without the need for any additional mounting devices. Accordingly, the dimensions of the module 4 in this embodiment may be such that the module 4 is contained within the dimensions of the height of standard EDP equipment (e.g., one rack unit, which is 1.75 inches high, or other vertical standard). As discussed below in reference to FIG. 6, this may permit a plurality of EDP equipment to be stacked together in a rack.

Figure 4:
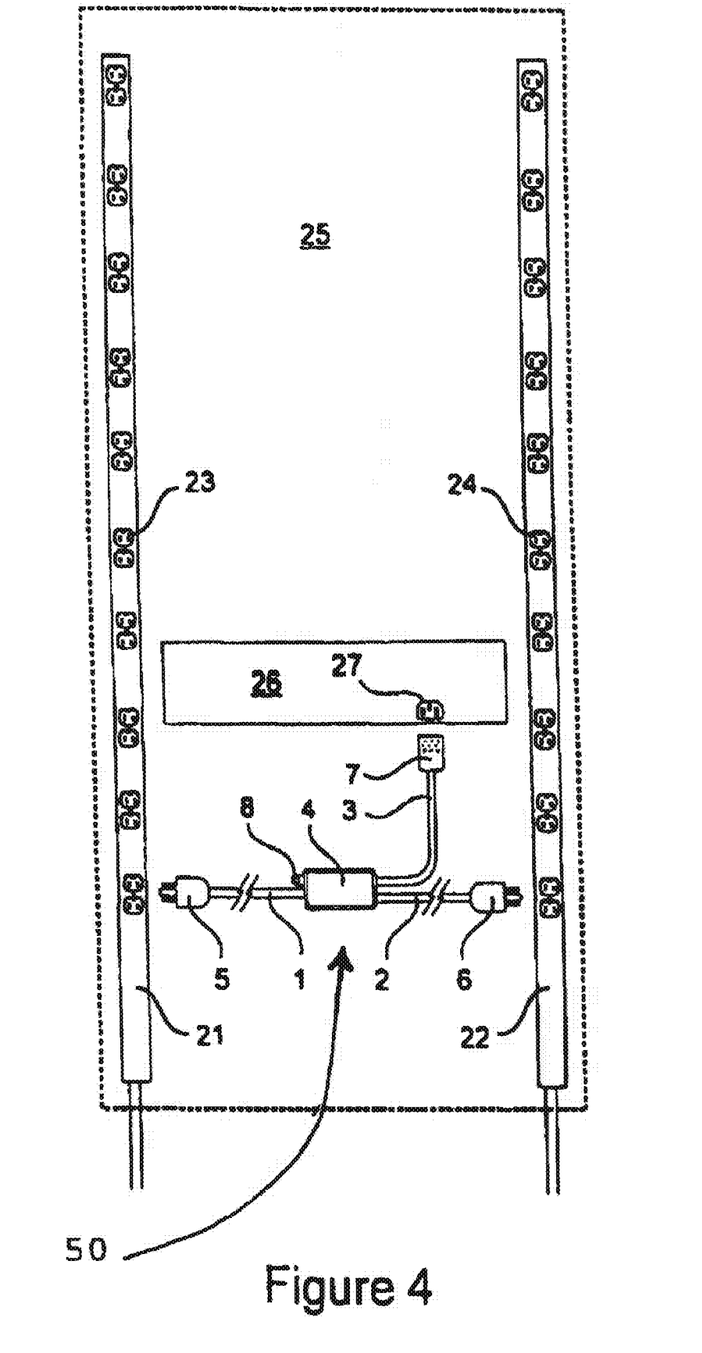
FIG. 4 is an exemplary diagram of an application that implements the automatic transfer switch.

An exemplary diagram of an application of the automatic transfer switch 50 is shown in FIG. 4. Equipment 26 may be mounted in a rack 25 having a primary power strip 21 and a secondary power strip 22 mounted on opposite sides of the rack 25. The power strips 21 and 22 include multiple outlets 23 and 24, respectively. The primary and secondary input plugs 5, 6 of the module 4 may be plugged into the outlets 23, 24, respectively, and the output receptacle 7 of the module 4 may be coupled to a plug 27 on the equipment 26. In normal use, this application may be duplicated for as many pieces of equipment as are mounted in the rack 25. In operation, the equipment 26 may receive power from the primary power strip 21, through the primary input cord 1 and the output cord 3. When an interruption of the voltage on the primary power strip 21 occurs, the automatic transfer switch 50 may then couple the equipment 26 to the secondary power strip 24, through the secondary input cord 2 and the output cord 3. In this manner, power redundancy is provided to the equipment 26.

The automatic transfer switch 50 may be particularly well-suited for high-density applications where the rack 25 may contain forty or more pieces of equipment. For example, in such a case, forty automatic transfer switches 50 with eighty input plugs 5, 6 and forty output receptacles 7 may be needed. Typically, this density requires careful attention to cord management in order to prevent blocking of air flow that may inhibit cooling of the equipment mounted in rack 25. Accordingly, in such applications, the automatic transfer switch 50 reduces this problem by including cords that have lengths that are suited for the specific application.

The shape of the module 4 may be substantially rectangular, in both end and side views, with the output cord 3 and one of the input cords 2 attached to one end of the module 4 and the other input cord 1 attached to the opposite end. Also, the cross-sectional area of the module 4 may be less than about 3 square inches (with each axis no more than about 1.75 inches) and, more preferably, less than about 2 square inches, and the length of the module 4 may be less than 5 inches, with a total volume contained within the module 4 of less than 10 and, more preferably, less than about 7 cubic inches.

One distinguishing feature of this embodiment of the automatic transfer switch 50 is that the relay 12 does not require any additional control circuits to operate. The absence of relay control circuits permits the automatic transfer switch function to be contained in a much smaller space than that required by switches with complex circuitry (e.g., high-speed controllers, optical isolators, current sensors, synchronizing circuits, or the like). The use of a DPDT relay (or matched multiple relays) to ensure break-before-make connections prevents connecting the two power sources in parallel, which may cause damage to equipment. The automatic transfer switch 50 takes advantage of the inherent energy storage capability of most common EDP equipment to operate the equipment during the short time interval (e.g., a few milliseconds) between the breaking of a connection from one source and the making of a connection to the other source. In this manner, the automatic transfer switch 50 provides the automatic transfer function in less space and at lower cost than traditional automatic transfer switches.

The automatic transfer switch 50 also provides for switching power sources right at the input to the equipment, thereby minimizing the probability of a failure between the switch and the equipment. Additionally, the automatic transfer switch 50 occupies a relatively small space, and it provides for better cable management in rack-mounted equipment. The length of the cords may allow placement of the module 4 adjacent to the back panel of each piece of equipment, and may allow connection to power strips without excess cord length. This configuration eliminates the tangle of power cords usually associated with rack-mounted equipment. Although the automatic transfer switch is shown, in FIG. 4 and elsewhere above, as being positioned between a piece of equipment and a power strip or other power source receptacles, it will be appreciated that the automatic transfer switch may alternatively or additionally be located elsewhere in the power distribution topology. For example, the switch may be located in a standard duplex receptacle, in a dual power source plug strip, upstream from a pair of single power source plug strips, in a uniform power distribution (UPD) module, upstream from a pair of UPD modules or otherwise in connection with a leaf, branch or root of the topology of a power distribution system. In addition, the switch may be used in connection with interleaved UPD modules as described in PCT Application PCT/US2009/038427 entitled "Power Distribution Systems and Methodology" which claims priority from U.S. Provisional Application 61/039,716, both of which are incorporated by reference herein, to provide further options to avoid disruption of power delivery.

Figure 6:
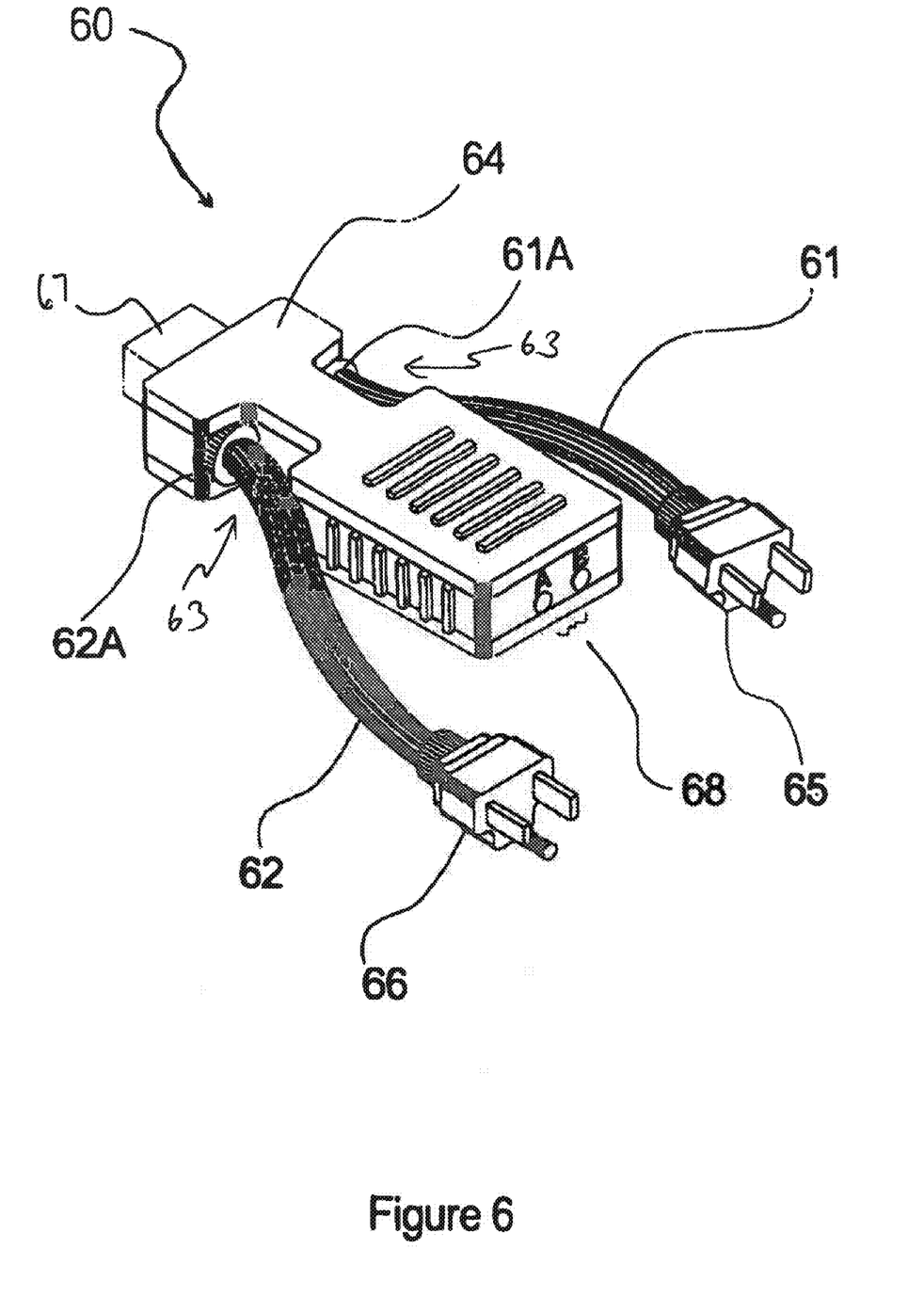
FIG. 6 is a perspective drawing of another embodiment of an exemplary automatic transfer switch.

FIG. 6 illustrates another embodiment of an automatic transfer switch 60 in which a receptacle 67 may be directly connected to a module 64. In this configuration, similar to the switch 50 shown in FIG. 5, the module 64 may be plugged directly into a piece of equipment, without the need for any additional mounting devices. That is, the module 64 is self-supporting. Accordingly, the dimensions of both of the minor axes of the module 64 in this embodiment may be such that the module 64 is contained within the dimensions of the height of standard EDP equipment (e.g., one rack unit, which is 1.75 inches high). In this embodiment, the cross section area of the module relative to the major axis is preferably less than or equal to 2 square inches. This may permit a plurality of EDP equipment to be stacked together in a rack. Further, since the placement and orientation of the plug on the back of EDP equipment is not standardized, the vertical and horizontal installed height of the module 64 should be less than one rack unit. The depth of the module 64 may also become an issue when used with devices that have a relatively large depth (e.g., some servers). Therefore, the depth of the module 64 may be constrained to less than about 5 inches, e.g., 4.25 inches. Preferably, the module 64 has a volume of less than about 10 cubic inches, and more preferably, less than about 7 cubic inches. Further, two power cords 61, 62 may be coupled to the module 64 and may include a primary input cord 62 and a secondary input cord 61, terminated with plug 66 and plug 65 respectively. The cords 61, 62 may be coupled to the module 64 by strain-relieving devices 61A-62A. As shown, the cords 61, 62 extend from the module 64 close to the receptacle 67 to reduce the torque imposed by the cords 61, 62 on the module when plugged into power sources. The recesses 63 in the module 64 allow the power cords 61, 62 to be routed without extending beyond the width of the module. This feature allows the module to be 1 u in width and be mountable vertically in a 1 u space. This is important in relation to space limitations found in data center racks, where a shorter depth piece of equipment is mounted between two longer depth pieces of equipment. If the shorter depth equipment has a vertically oriented power input the automatic switch module may have to be oriented vertically to insert into the power input, which might not be possible without the recesses (i.e., if the module 64 had a vertical dimension of 1 u when mounted vertically and the cords 61, 62 required additional space. The module 64 may also include a status indicator 68 to allow a user to determine which power source is active. For example the "A" light may be illuminated when the receptacle 67 is electrically coupled to the plug 66, and the "B" light may be illuminated when the receptacle 67 is electrically coupled to the plug 65. In addition, the module 64 may include additional status indicators such as current limit warning and over-current limit indicators as described herein.

Figure 7:
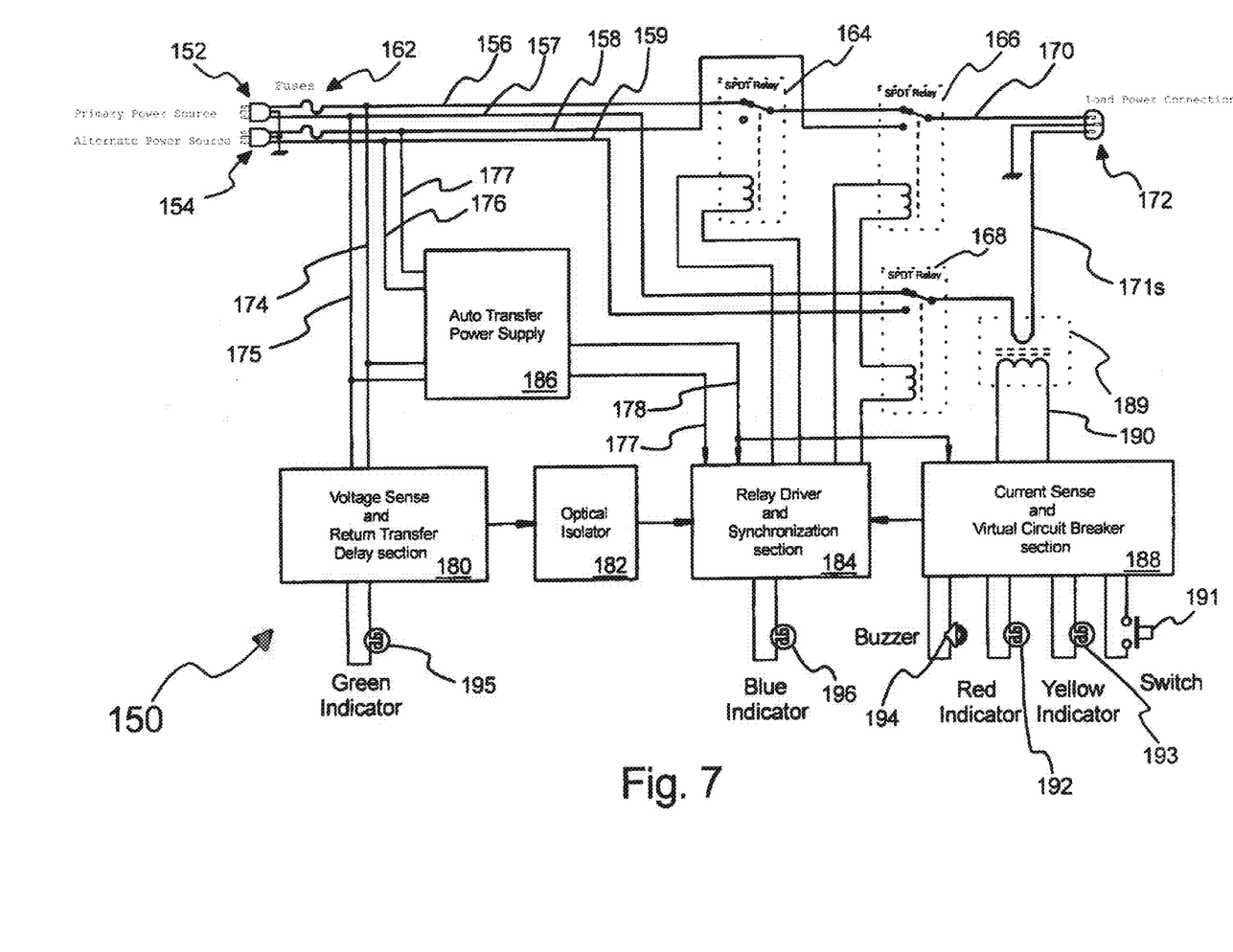
FIG. 7 is a schematic diagram of another embodiment of an exemplary automatic transfer switch.

FIG. 7 illustrates a schematic diagram of another embodiment of an automatic transfer switch module 150. The basic functionality of the module 150 is to facilitate the fast transfer of power delivered to a load power connection 172 between a primary power source connection 152 and an alternate power source connection 154. For example, the module 150 may transfer the power during a period that is less than about 15 milliseconds, and preferably less than 10 milliseconds. Generally, the module 150 operates to couple the primary power source connection 152 to the load power connection 172 when the power at a primary power source is stable. Further, in response to an interruption of power at the power source coupled to the primary power source connection 152, the module 150 is operable to couple the load power connection 172 to the alternate power source connection 154 that is connected to an alternate power source until power at the primary power source connection 152 is restored. The module 150 may be operable to sense various power quality features on the primary power source connection 152, and to switch the power connection in response to these features. The power quality features sensed by the module 150 may include interruptions, overvoltage, undervoltage, voltage fluctuations, frequency variations, or the like. The specific features and operation of the module 150 are described in detail below.

The module 150 may include two single pole double throw (SPDT) relays 166 and 168 to facilitate the transfer of power between the primary power source connection 152 and the alternate power source connection 154. As shown, the relay 166 couples the hot conductor 156 of the primary power source connection 152 to the hot conductor 170 of the load power connection 172. The relay 166 also couples the hot node 158 of the alternate power source 154 with the hot conductor 170 of the load power connection 172. Similarly, the neutral conductors 157, 159 of the primary power source connection 152 and the alternate power source connection 154, respectively, are also coupled to the neutral conductor 171 of the load power connection 172 through relay 168.

The module 150 also includes a third SPDT relay 164 that is positioned in the path of the primary power source connection 152. The relay 164 serves to protect against an undesirable effect referred to herein as "arc carryover." Arc carryover occurs when the current through the contacts of a relay is great enough to allow an arc generated by the breaking of a contact to which a load was previously connected to continue until the contact reaches the alternate source. This may result in an effective short-circuit between two power sources, which under certain conditions, may cause the current to increase rapidly, which could damage equipment or trip a circuit protection device, causing system downtime. One way to reduce the probability of arc carryover is to ensure a sufficient separation gap between the primary input relay contact and the secondary relay contact. However, in space-limited applications, the size restrictions for the module 150 may preclude the use of relays having a sufficient separation gap.

To reduce the likelihood of arc carryover, the relay 164 is introduced in the path of the primary power source connection 152 as a disconnect relay. That is, the alternate pole of the relay 164 is unconnected. The relay 164 functions in a timed relationship with the relays 166, 168 in a manner such that during a transfer sequence from one power source to the other, the disconnect relay 164 disengages the primary power path from the secondary power path during the short period when the transfer relays 166 and 168 change from one position to the other. By slightly offsetting the timing of the actions of the disconnect relay 164 from the switching action of the transfer relays 166 and 168, it can be assured that the AC power will pass through a zero current level during the transfer cycle. This, in conjunction with the addition of the third separation gap provided by the relay 164, increases the arc suppression capacity of the module 150 significantly. To control the timing and driving of the relays 164, 166, and 168, a Relay Driver and Synchronization section 184 is provided. The section 184 may include various analog and digital electronics to drive the relays 164, 166, and 168. Driving the relay by using electronics, as opposed to direct actuation from the power sources, has advantages that are discussed below.

To further protect against arc carryover, a fuse 162 is positioned in the path of the alternate power source connection 154. It should be appreciated that a fuse may be applied in the path of the primary power source connection 152 in addition to, or instead of, the path of the alternate power source connection 154. The fuse 162 may be a fast acting fuse that is operable to open prior to the opening of a branch circuit breaker, which may prevent localized overload conditions from affecting other attached equipment on the same branch circuit. In one embodiment, a 20 A power-limiting fast-acting fuse is used, but other values may be substituted to provide the desired protection in various applications of the module 150.

The inventors have further recognized that it may be desirable to introduce a delay when returning power from the alternate power source connection 154 to the primary power source connection 152 following an interruption on the primary power source. In this regard, a delay may help reduce the number of transitions in the event that the primary power source is intermittent, or in a low or high voltage, condition that may cause the relays to transfer back and forth unnecessarily. As an example, a delay of three to five seconds may be introduced from the time the primary power source is stable to the time the module 150 returns power from the alternate power source to the primary power source. To provide this delay, a Voltage Sense and Return Transfer Delay section 180 is provided. The section 180 is operable to sense the voltage at the primary power source connection 152 via nodes 174 and 175. Once the section 180 has determined that an acceptable voltage at the primary power source 152 has been available for a predetermined period of time (e.g., 3 to 5 seconds or other desired time period), the section 180 provides a signal to the Relay Driver and Synchronization section 184. As shown, the sections 180, 184 are coupled together by an optical isolator 182 that functions to electrically isolate the primary power source connection 152 from the alternate power source connection 154. After receiving a signal from the section 180, the Relay Driver and Synchronization section 184 may then use electronic control circuitry to activate the relays 164, 166, and 168, which in turn returns power from the alternate power source connection 154 to the primary power source connection 152. It should be appreciated that the sections 180 and 184 may include various digital and/or analog components to achieve the voltage sensing and delay functions. For example, in one embodiment the section 180 includes a digital timer.

The use of electronic control circuitry by section 184 to drive the relays 164, 166, 168, instead of direct actuation by the primary power source, may provide significant advantages. In previous embodiments, the relays are energized by the primary power source, such that the primary power source remains connected to the load power connection when the primary power source is stable. In the event of a fault condition on the primary power source (e.g. undervoltage, overvoltage, frequency variation, outage, etc.) the relays are not held, and therefore release, which in turn connects the load to the alternate power source. Upon return of power to the primary source, the relays immediately energize, therefore reconnecting the load to the primary power source. As discussed above, this configuration does not allow for a delay to be introduced when transferring from the alternative power source back to the primary power source. Further, this configuration requires the relays to be energized the majority of the time (i.e., whenever the primary power source is stable), causing unnecessary power consumption and reduced relay life expectancy, which reduces the overall reliability of the module 150.

To solve the aforementioned problems, the relays 164, 166, 168 are driven from the alternate power source connection 154. This is accomplished by coupling the relay driver section 184 to the alternate power source connection 154 through nodes 176 and 177. Therefore, the previously described electronic delay circuitry may now use the available alternate power source to operate from during the delay period. Further the relays 164, 166, and 168 may be energized only during an outage period of the primary power source 152, which may be a relatively rare event. Therefore, this configuration may significantly extend the probable life expectancy of the relays, reduce power consumption, and improve the overall reliability of the module 150. MOVs and/or Zeners can be added for circuit protection.

Use of multiple relays 164, 166, 168 in the primary electrical path allows the capability to completely disconnect the load power connection 172. This feature improves the reliability of the device as a whole. Over-current conditions can be detected and the relays 164, 166, 168 can be placed in a state where the output to the load power connection 172 is disconnected. This feature is referred to as the Virtual Circuit Breaker (VCB).

The VCB operates by sensing the output current in the neutral node 171 with a current sensing transformer 189. The sensed current 190 is processed in a two node filter/shaping circuit 188. The filtering and shaping is performed to emulate the characteristics of a fuse. A variety of interruption delay curves can be emulated by altering the parameters of the circuit. Time and current are factors in the processing. The circuit used in this embodiment is analog and digital in nature, but various methods could be applied to perform the filtering and shaping function. The filtered signal is compared to a reference value and if the value exceeds a preset limit of, for example, 12 Amps of equivalent output current, an indicator 193 (yellow) may be energized, and an audible alert 194 (buzzer) may be energized. This alerts users that they are approaching the limit of the circuit. Power is allowed to continue to the load power connection 172. If the load on the load power of connection 172 continues to increase, and it exceeds a second preset limit of, for example, 17 Amps continuously for more than about 11 seconds, the VCB may disconnect the electrical path from both input sources 152, 154 and the load power connection 172. This is achieved by energizing the disconnect relay 164, while simultaneously not energizing the selector relay 166. The VCB then continuously holds this state (latched). This then requires user intervention to reset the device to usable condition by actuating the reset switch 191, or disconnecting the device from all source power. In addition to disconnecting the power when an overload condition exists, the audible alert 194, and the visual overload indicator 192 (Red) are energized.

The green indicator 195 is energized from the Voltage Sense section 180 when adequate AC power is detected on the Primary AC Power Source.

The blue indicator 196 is energized from the Relay Driver section 184 when the Alternate AC Power Source is selected.

It will be appreciated that, although the power source for the device may be associated with either input 152, 154, power to operate the current sense circuits 188 and the relay driver section 184 must be present at all times. It will also be appreciated power may not be available from one of the sources 152 or 154 when power remains available from the other source 154 or 152, or one of the sources 152 or 154 may experience a limited power or over-current condition. Such situations may require that these sections, the current sense circuits 188 and the relay driver section 184, have power supplied to them by a source that is switched to available power. This is performed in the Automatic Transfer Power Supply (ATPS) 186.

Figure 8:
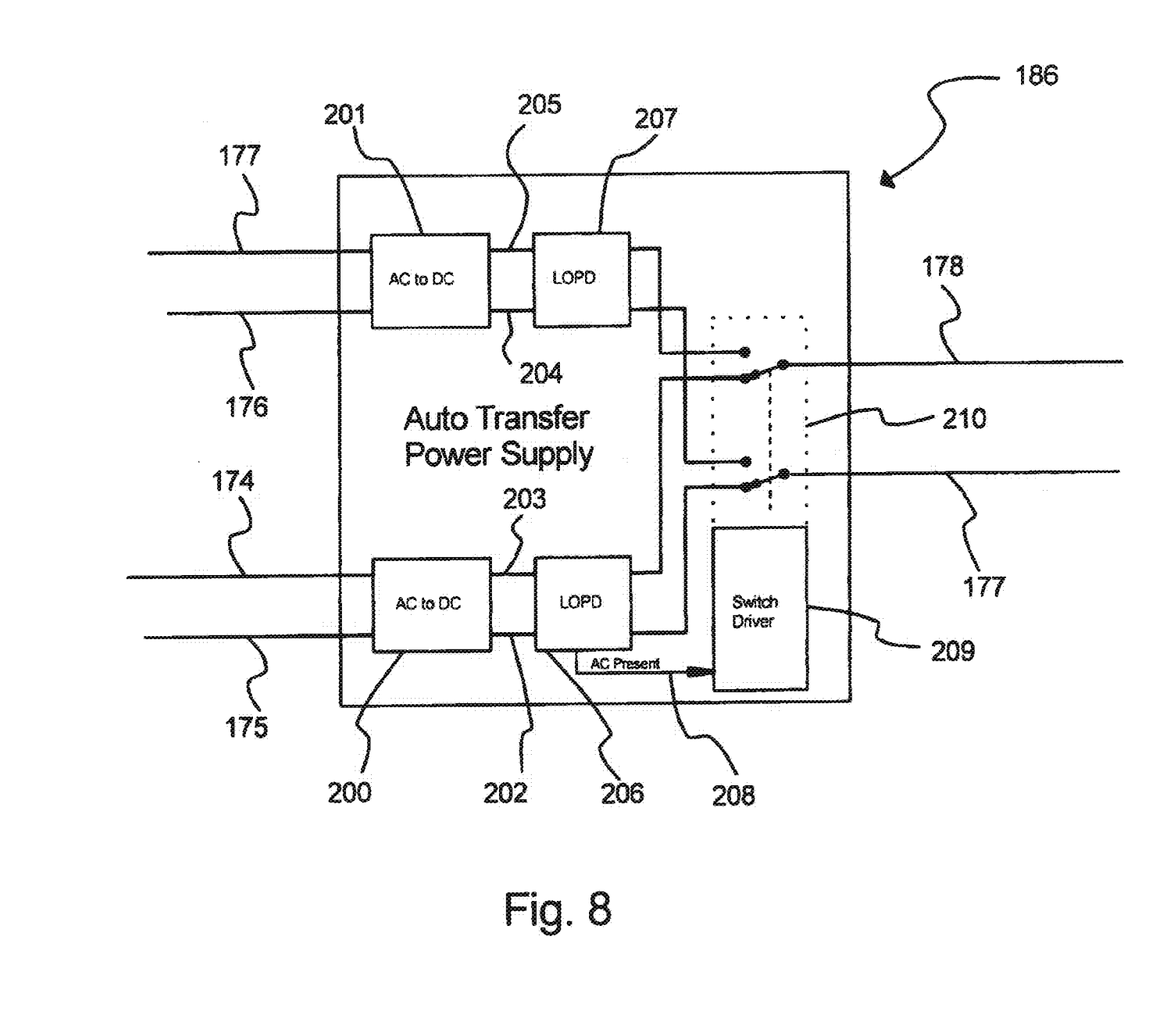
FIG. 8 illustrates the functionality of an automatic transfer power supply of the switch of FIG. 7.

FIG. 8 illustrates the functionality of the ATPS 186. The ATPS converts both the Primary Power Source 152, 177, 176 and the Secondary Power Source 154, 174, 175 into independent DC subset 202, 203, 204, 205, of voltages required by the Relay Driver section 184 and the Current Sense section 188. Primary AC line voltage enters the ATPS 186 via Primary AC power input 177, 176 and is converted from AC mains voltage to DC outputs 205, 204 in the AC to DC converter 201. Alternate AC line voltage enters the ATPS 186 via Alternate AC power input 174, 175 and is converted from AC mains voltage to DC outputs 203, 202 in the AC to DC converter 200. It should be appreciated that the DC outputs comprise several DC voltages as well as Line Neutral references. The Primary DC power output 205, 204 passes through the Loss Of Power Disconnect (LOPD) switch 207 and to one side of the electronic selector switch 210. The alternate DC power output 203, 202 passes through the Loss Of Power Disconnect (LOPD) switch 206 and to one side of the electronic selector switch 210. The LOPD 206 on the Alternate DC Power side also has an AC Present output 208 that controls the action of the electronic selector switch 210 via the Switch Driver 209. In the normal operating state of the system 150, power to run the Relay Driver section 184 and the Current Sense section 188 (FIG. 7) is derived from the Alternate Power Source side. In the event of loss of the Alternate power Source, the electronic selector switch 210 transfers the source of DC power from the Alternate DC supplies 203, 202 to the Primary DC supplies 205, 204 thus maintaining power to the Relay Driver section 184 and the Current Sense section 188 (FIG. 7).

In the event of loss of AC power from the Primary AC Power Source input 177, 176, the Primary LOPD 207 completely disconnects the DC path form the AC to DC converter 201 from the electronic selector switch 210. In turn, in the event of loss of AC power from the Alternate AC Power Source input 174, 175, the Alternate LOPD 206 completely disconnects the DC path form the AC to DC converter 20 from the electronic selector switch 210. These disconnections are preferred for safety reasons and may be required to obtain approvals from underwriting authorities. It should be appreciated that various electronic and/or electro-mechanical means can be employed to perform each of the functions of each of the sections described herein. For example, the electronic selector switch 210, could be a mechanical relay.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. An automatic transfer switch for automatically switching an electrical load between two power sources, the automatic transfer switch comprising:
  a switch module;
  primary and secondary input cords, each attached to said switch module, and each for receiving power from a different one of said two power sources;
  an output cord, attached to said switch module, for supplying power to said electrical load; and
  a relay disposed within said switch module and coupled to said primary input cord; wherein said relay is operable to sense a power quality on said primary input cord, such that:
    when said power quality is acceptable, a state of said relay is electronically controlled by said power of said primary input cord so as to couple said output cord to said primary input cord; and
    when said power quality is unacceptable, said state of said relay is electronically controlled by said power of said primary cord so as to automatically de-couple said output cord from said primary input cord and to automatically couple said output cord to said secondary input cord.

2. The automatic transfer switch of claim 1, wherein each of said input and output cords contains a line conductor and a neutral conductor.

3. The automatic transfer switch of claim 2, wherein said relay comprises a mechanical relay.

4. The automatic transfer switch of claim 3, wherein said relay comprises a coil connected between said line conductor and said neutral conductor of said primary input cord.

5. The automatic transfer switch of claim 1, wherein said relay comprises a solid-state relay.

6. The automatic transfer switch of claim 1, wherein said switch module occupies a volume of less than ten cubic inches.

7. The automatic transfer switch of claim 1, wherein said switch module has a length of less than five inches.

8. The automatic transfer switch of claim 1, wherein said switch module has a cross-section where each axis is less than about 1.75 inches.

9. The automatic transfer switch of claim 1, wherein said switch module is formed by an injection molding process or an insertion molding process.

10. The automatic transfer switch of claim 1, wherein said switch module case comprises a thermoplastic material.

11. The automatic transfer switch of claim 1, wherein said switch module case comprises a metal enclosure.

12. The automatic transfer switch of claim 1, wherein said switch module includes an elongated housing having two ends, wherein said output cord and one of said two input cords are attached to one of said two ends and the other of said two input cords is attached to the other of said two ends.

13. The automatic transfer switch of claim 1, wherein said switch module comprises a permanent magnet for attaching said switch module to a magnetic surface.

14. The automatic transfer switch of claim 1, wherein said switch module comprises a mounting tab for supporting said switch module.

15. The automatic transfer switch of claim 1, wherein said output cord is coupled to said primary input cord if said voltage is greater than a first value, and to said secondary input cord if said voltage is less than a second value.

16. The automatic transfer switch of claim 1, wherein said input cords are no more than 24 inches in length.

17. The automatic transfer switch of claim 1, wherein said output cord is no more than 12 inches in length.

18. The automatic transfer switch of claim 1, wherein said relay is operable to sense said power quality on said primary input cord directly via an electrical coupling between said primary input cord and a coil of said relay.

19. The automatic transfer switch of claim 1, wherein said relay is operable to sense said power quality, automatically de-couple said output cord from said primary input cord, and automatically couple said output cord to said secondary input cord without any additional control circuitry.

20. The automatic transfer switch of claim 1, further comprising:
an arc carryover suppression module disposed within said switch module and operable to force an interrupt in current flowing from said switch module into said output cord between said relay automatically de-coupling said output cord from said primary input cord and automatically coupling said output cord to said secondary input cord.

21. The automatic transfer switch of claim 1, wherein in order for power quality to be deemed acceptable it must be at least above a first threshold and further comprising:
an indicator module operable to indicate when said power quality falls below a second threshold, said second threshold being above said first threshold such that said relay remains energized when said power quality is between said first threshold and said second threshold.

22. The automatic transfer switch of claim 21, wherein said indicator module is operable to indicate when said power quality falls below a second threshold using an audio and/or visual indication.

23. The automatic transfer switch of claim 21, wherein said second threshold is a current limit warning indication and said first threshold is an over-current limit indication.

24. The system of claim 1, wherein said power of said primary cord controls said state of said relay free from any digital logic.

25. An automatic transfer switch for automatically switching an electrical load between two power sources, the automatic transfer switch comprising:
a switch module;
primary and secondary input cords, each attached to said switch module, and each for receiving power from a different one of said two power sources;
an output cord that is attached to said switch module for supplying power to said electrical load;
a relay disposed within said switch module and having a power quality sensitive input coupled to said primary input cord, the relay being operable to couple said output cord to said primary input cord when said power quality on said primary input cord is acceptable, and to switch coupling of said output cord from said primary input cord to said secondary input cord when said power quality at said primary input cord is unacceptable; and
an arc carryover suppression module disposed within said switch module and operable to force an interrupt in current flowing from said switch module into said output cord when said relay switches coupling of said output cord from said primary input cord to said secondary input cord.

26. The automatic transfer switch of claim 25, wherein said switch module case is formed from a plastic material by an injection molding process.

27. The automatic transfer switch of claim 25, wherein said switch module case comprises a metal enclosure.

28. The automatic transfer switch of claim 25, wherein said relay is a transfer relay and said arc carryover suppression module comprises a disconnect relay disposed in a primary power path between said primary input cord and said transfer relay.

29. The automatic transfer switch of claim 28, wherein said disconnect relay is operable to disengage said primary power path from a secondary power path between said secondary input cord and said transfer relay while said transfer relay switches coupling of said output cord from said primary input cord to said secondary input cord.

30. The automatic transfer switch of claim 25, wherein said auto-switching device is configured to be coupled with a rack-mounted device to power said rack-mounted device, such that said auto-switching device and said rack-mounted device together fit within a single standard rack mounting space.

31. The automatic transfer switch of claim 30, wherein said auto-switching device occupies less than 10 cubic inches of space.

32. A method for use in providing power to an electrical device, comprising the steps of:
providing an auto-switching device having a first interface for coupling to a first power source, a second interface for coupling to a second power source, and a third interface for coupling to the electrical device to be powered, wherein said auto-switching device is operative to use primary power received from said first power source via said first interface to control said auto-switching device to power said electrical device using said primary power when a power quality of said primary power is acceptable, such that said auto-switching device automatically switches so as to power said electrical device using secondary power when a power quality of said primary power is unacceptable, said secondary power being received from said secondary power source via said secondary interface;

coupling said first interface to said first power source;
coupling said second interface to said second power source; and
coupling said third interface to said electrical device.

33. The method of claim 32, wherein said auto-switching device occupies less than 10 cubic inches of space.

34. A system for powering a rack-mounted electrical device, the system comprising:
a rack including a plurality of vertically spaced mechanisms for attaching to or supporting electrical devices, said rack further including first and second power strips associated with respective first and second power sources; and
an auto-switching module including a first cord coupled to the first power strip, a second cord coupled to the second power strip, and a third cord coupled to an electrical device supported by one of said mechanisms of said rack, wherein said auto-switching module is operative to use power received via said first power strip to maintain a first coupling between said third cord and said first cord so long as a power quality of said power remains acceptable, such that, when said power quality falls below said threshold, said first coupling is automatically released and a second coupling is automatically established between said third cord with said second cord.

35. The system of claim 34, wherein:
said rack and said vertically spaced mechanisms define a plurality of maximum device envelopes; and
said auto-switching device is sized so that said auto-switching device and one of said electrical devices together occupies less than a maximum device envelope of space when said one of said electrical devices is coupled with said auto-switching device and installed in said rack.

36. An automatic transfer switch for automatically switching an electrical load between two power sources, the automatic transfer switch comprising:
a switch module;
primary and secondary input cords, each attached to said switch module, and each for receiving power from a different one of said two power sources;
an output receptacle, attached to said switch module, for supplying power to said electrical load; and
a relay disposed within said switch module and coupled to said primary input cord; wherein said relay is operable to sense a power quality on said primary input cord, such that:
when said power quality is acceptable, a state of said relay is electronically controlled by power of said primary input cord so as to couple said output receptacle to said primary input cord; and
when said power quality is unacceptable, said state of said relay is electronically controlled by power of said primary input cord so as to automatically de-couple said output receptacle from said primary input cord and to automatically couple said output receptacle to said secondary input cord.

37. The automatic transfer switch of claim 36, wherein said switch module case is formed from a plastic material by an injection molding process or an insert molding process.

38. The automatic transfer switch of claim 36, wherein said switch module case comprises a metal enclosure.

39. An automatic transfer switch for automatically switching an electrical load between two power sources, the automatic transfer switch comprising:
a switch module;
primary and secondary input cords, each attached to said switch module, and each for receiving power from a different one of said two power sources;
an output receptacle, attached to said switch module, for supplying power to said electrical load; and
circuitry disposed within said switch module and coupled to said primary and secondary input cords and said output receptacle; wherein said circuitry is operable to use power from said primary input cord to maintain a first coupling between said primary input cord and said output receptacle while a power quality on said primary input cord is acceptable, such that, when said power quality is unacceptable, said first coupling is automatically disengaged and a second coupling is automatically established between said secondary input cord and said output receptacle.

40. The automatic transfer switch of claim 39, wherein said circuitry is operable to automatically couple said output receptacle to one of said primary and secondary input cords in accordance with a return of the quality of available power on said primary cord after a predetermined period of time.

41. The automatic transfer switch of claim 39, wherein said circuitry comprises one or more relays.

42. The automatic transfer switch of claim 39, wherein said circuitry comprises a timer.

43. The automatic transfer switch of claim 39, wherein at least a portion of said circuitry receives power from a power source that is coupled to said secondary input power cord.

44. The automatic transfer switch of claim 39, wherein said automatic transfer switch has an average power consumption of less than about 2 watts at maximum load.

45. The automatic transfer switch of claim 39, wherein said automatic transfer switch has an average power consumption of less than about 200 milliwatts at minimum load.

46. The automatic transfer switch of claim 45, wherein said automatic transfer switch occupies a volume of less than ten cubic inches.

47. The automatic transfer switch of claim 39, wherein said circuitry is operable to automatically couple said output receptacle to one of said primary and secondary input cords in a period of time that is less than about 15 milliseconds.

48. The automatic transfer switch of claim 39, wherein said power quality includes at least one of voltage sag, voltage fluctuations, frequency variations, and interruptions.

49. The automatic transfer switch of claim 39, wherein said circuitry includes an optical isolation circuit for isolating said two power sources.

50. The automatic transfer switch of claim 39, wherein each of said input and output cords contains a line conductor and a neutral conductor.

51. The automatic transfer switch of claim 39, wherein said switch module occupies a volume of less than ten cubic inches.

52. The automatic transfer switch of claim 39, wherein said switch module has a length of less than 4.5 inches.

53. The automatic transfer switch of claim 39, wherein said switch module has a cross sectional area less than or equal to 2 square inches, where neither of the minor axes of the module exceed 1.75 inches.

54. The automatic transfer switch of claim 39, wherein said switch module is formed by an insert molding process.

55. The automatic transfer switch of claim 39, wherein said switch module comprises a thermoplastic material.

56. The automatic transfer switch of claim 39, wherein said switch module comprises a metal enclosure.

57. The automatic transfer switch of claim 39, wherein said input cords are no more than 24 inches in length.

* * * * *